United States Patent Office 3,418,312
Patented Dec. 24, 1968

3,418,312
PROCESS FOR PRODUCING SOLUBLE TRI-
METHYLSILYLATED CELLULOSE
Johann F. Klebe, Schenectady, N.Y., assignor to General
Electric Company, a corporation of New York
No Drawing. Filed Sept. 9, 1966, Ser. No. 578,138
2 Claims. (Cl. 260—212)

ABSTRACT OF THE DISCLOSURE

Trimethylsilylated celluloses which are soluble in common organic solvents are produced by the reaction of cellulose with trimethylchlorosilane that has previously been reacted with a mono or disaccharide. These trimethylsilylated celluloses are useful as paper release agents and the like.

This invention relates to a method of producing soluble trimethylsilylated cellulose.

Heretofore, it has been known to prepare silicon derivatives of cellulose by treating cellulose with an alkylchlorosilane in the presence of a hydrogen halide acceptor such as a tertiary amine, as is set forth in United States Patent 2,562,955, issued Aug. 7, 1951. This patent teaches a method that produces trimethylsilylated celluloses which are insoluble in the common organic solvents employed to dissolve the usual cellulosic esters and ethers, e.g., benzene, toluene, chloroform, ethylene chloride, carbon tetrachloride, etc.

It is believed that the insolubility of these trimethylsilylated celluloses is caused by impurities in the trimethylchlorosilane. The commercial trimethylchlorosilane available is prepared either by the reacttion of silicon and methylchloride or by the reaction of silicon tetrachloride and methyl Grignard reagent which methods produce mixtures of the methylchlorosilanes. The boiling points of these methylchlorosilanes are very close to one another and thus during the distillations minor amounts, i.e., less than 1% by weight, of impurities remain in the various fractions. Although not wishing to be bound, it is believed that the impurity in trimethylchlorosilane is methyltrichlorosilane, a very minor amount, i.e., less than 1% by weight, of which will cause crosslinking and insolubilization of the cellulosic derivatives.

I have discovered a method whereby trimethylsilylated celluloses can be prepared which contain from 2 to 3 trimethylsilyl units per anhydroglucose unit in the cellulose, and which are soluble in the common organic solvents usually employed to dissolve the cellulosic esters and ethers, e.g., chloroform, benzene, toluene, etc. The production of these soluble trimethylsilylated celluloses, greatly increases the utility of such materials, since they now can be employed in solutions to coat various substrates to make the substrate hydrophobic and to give the substrate better release properties. For example, when trimethylsilylated cellulose is coated onto paper, employed in the making of milk cartons, the release properties of the paper are greatly improved.

Cellulose is added to an admixture of trimethyl chlorosilane, a mono- or disaccharide, a solvent and a tertiary amine which has been heated to a temperature of from 20 to 150° C. and maintaining the resulting mixture at a temperature of from 50° C. to 250° C., whereby the cellulose and the trimethylchlorosilane react to produce a solution of trimethylsilylated cellulose, and recovering the trimethylsilylated cellulose from the reaction mixture.

The trimethylsilylated cellulose polymer is most readily recovered from the reaction medium by adding the solution to an alcohol, e.g., methanol, whereby said polymer is precipitated from the solution. It is preferred that the methanol contain a small amount of sodium acetate so as to preclude the precipitation of the tertiary amine hydrochloride with the polymer, thereby leading to undesirable side reactions.

The cellulose employed in this invention is that derived from cotton or from wood pulps, preferably chemical wood pulp, such as sulfate, sulfite or soda pulps from which pentosan, resin, lignin and like constituents have been removed.

The amount of the saccharide employed in the process of this invention is not narrowly critical and can range, by weight, from 0.1 part to 10 parts of the saccharide per 100 parts of the trimethylchlorosilane. It is preferred to employ from about 1 to about 10 parts, by weight, of the saccharide per 100 parts, by weight, of the trimethylchlorosilane.

The amount of trimethylchlorosilane employed in the process of this invention is not critical and is dependent upon the amount of trimethylsilyl substitution one desires in the cellulose. As is known, cellulose consists of repeating anhydroglucose units which have three hydroxyl groups per unit. If it is desired to replace essentially all of the hydroxyl groups with trimethylsilyl groups, one should employ at least 3 moles of trimethylchlorosilane per mole of cellulose. It is particularly preferred that where one desires essentially complete trimethylsilylation of the cellulose that one employ a molar excess, for example, from 4 to 5 moles, of trimethylchlorosilane per mole of cellulose.

In conducting the process of this invention, one should employ at least one mole of the tertiary amine for each mole of the hydroxyl group in the cellulose to be trimethylsilylated. If less than this amount of the tertiary amine is employed, the excess hydrogen chloride liberated causes undesirable side reactions. It is particularly preferred that an excess of the tertiary amine be employed, i.e., at least 3 moles of the tertiary amine for each mole of cellulose, thereby insuring that all of the liberated hydrogen chloride will be neutralized, thus preventing undesirable side reactions.

A solvent is desirable in conducting the process of the present invention, to insure intimate contact of the reactants, for ease of reaction and ease of recovery of the reaction products. Solvents which can be employed are the aromatic hydrocarbon solvents such as benzene, toluene, xylene, and the like; the aliphatic hydrocarbon solvents such as pentane, hexane, cyclohexane, heptane, octane, and the like; the chlorinated aromatic and aliphatic hydrocarbon solvents such as methylene chloride, chloroform, carbon tetrachloride, perchloroethylene, trichloroethylene, chlorobenzene, dichlorobenzene, etc.

The amount of solvent employed in the process of this invention is not critical and can range, by weight, from 10 to 1000 parts of the solvent per 100 parts of the cellulose and trimethylchlorosilane. It is preferred for simplicity of operation and ease of recovery of the reaction products to employ at least 100 parts, by weight, of the solvent per 100 parts, by weight, of the total weight of the cellulose and trimethylchlorosilane.

The mono- and disaccharides which can be employed in this process of the present invention are, for example, sucrose, glucose, galactose, fructose, mannose, dextrose, allose, etc.

The tertiary amines which can be used as hydrogen halide acceptors in the process of this invention include aliphatic tertiary amines, tertiary polyamines and cyclic tertiary amines. The aliphatic tertiary amines, including cycloaliphatic tertiary amines are, for example, trimethylamine, triethylamine, tripropylamine, tributylamine, dimethylpropylamine, dimethyl(phenylethyl)amine, benzylmethylethylamine, 1 - dimethylamino-2-phenylpropane, 1-dimethylamino-4-pentene, etc.; tertiary polyamines are N,N,N′,N′-tetraalkylpropanediamines, N,N,N′,N′-tetraalkylethylenediamines and N,N,N′,N′,-tetraalkylbutane diamines, etc. The tertiary amines also include tertiary aliphatic-tertiary aromatic amines, for example, piperidinoalkylpyridines, dialkylaminoalkylpyridines, morpholinoalkylenepyridines, and so forth. The tertiary polyamines are, for example, N,N,N′,N′-tetramethylethylenediamine, N - ethyl - N,N′,N′ - trimethylethylenediamine, N,N,N′,N′ - tetraethylethylenediamine, N,N,N′,N′ - tetra-n-amylethylenediamine, 1,2-bis (2,6-dimethylpiperidino)-ethane, N,N,N′,N″,N″-pentaethyldiethylenetriamine, 2-($\beta$-dimethylaminoethyl)-6-methylpyridine, etc. Examples of the cyclic amines are the pyridines; $\alpha$-, $\beta$- and $\gamma$-collidine; $\alpha$-, $\beta$- and $\gamma$-picoline; 2,4-lutidine, dipyridyls, N-alkylpyrroles, N-alkylpyrrolidines, N-alkylpiperidines, and N-alkyltriazoles, etc.

The following example serves to further illustrate this invention. All parts are by weight unless otherwise stated.

Example 1

A mixture of 50 grams of toluene, 15 grams of pyridine, 10 grams of trimethylchlorosilane and 1.0 gram of powdered sucrose was heated with stirring at 100–110° C. for 40 minutes, during which time the sucrose formed a light brown solid which remained insoluble in the reaction mixture. Wood cellulose (1.6 grams) was then added to this mixture and the mixture stirred at 105–110° C. for 1 hour. After this time, the cellulose was completely dissolved and pyridine hydrochloride was suspended in the viscous reaction mass. Approximately 50 cc. of toluene was added and the mixture filtered. The filtrate which still contained some pyridine hydrochloride was slowly added with stirring to 1 liter of methanol containing 5 grams of sodium acetate. The trimethylsilylated cellulose polymer was obtained as a colorless fiber. The fiber was washed with methanol and dried at 40° C. in vacuo. A yield of 2.9 grams of trimethylsilyl cellulose was obtained which is 77% of theory based on the weight increase for complete silylation. This trimethylsilyl cellulose was completely soluble in benzene and had the following analysis: Carbon, 46.66%; hydrogen, 8.75%; silicon, 20.91%.

The amount of silicon as determined by the analysis is equivalent to 2.82 trimethylsilyl groups per anhydroglucose unit.

The trimethylsilylated celluloses of this invention find utility as paper release agents and the like. Thus, for example, paper can be treated with a solvent solution of the trimethylsilylated cellulose and the solvent removed by slight heating to yield a paper coated with silylated cellulose which is now hydrophobic and, in addition, has good release properties when employed, for example, in applications such as the spouts of milk cartons. Solutions of the trimethylsilylated cellulose can be used to cast films for packaging, protection, insulation, and the like. The solutions can also be spun by techniques known to those skilled in the art to yield fibers which combine the properties of cellulose and siloxanes. These trimethylsilylated celluloses can also be used as varnishes, paints and protective coatings.

It will, of course, be apparent to those skilled in the art that in addition to pyridine and sucrose employed in the examples, other amines and mono- or disaccharides, many examples of which have been given above, may be employed without departing from the scope of the invention. The conditions whereby the silylation is carried out may also be varied as is indicated previously by the disclosure and examples.

What I claim as new and desire to secure by Letters Patent of the United States is:

1. A process for producing trimethylsilylated cellulose containing from 2 to 3 trimethylsilyl units per anhydroglucose unit, said cellulose being soluble in a solvent selected from the class consisting of aliphatic hydrocarbons, aromatic hydrocarbons, and chlorinated aliphatic and aromatic hydrocarbons which comprises adding cellulose to an admixture of commercial trimethylchlorosilane, a mono- or disaccharide, a solvent and a tertiary amine which admixture has been heated to a temperature of from 20° to 150° C., and heating the resulting mixture to a temperature of from 50° C. to 250° C. whereby said cellulose and said trimethylchlorosilane react to produce a solution of trimethylsilylated cellulose and recovering said trimethylsilylated cellulose from the reaction mixture.

2. A process as claimed in claim 1 wherein said saccharide is sucrose and said tertiary amine is pyridine.

References Cited

UNITED STATES PATENTS

| | | | |
|---|---|---|---|
| 2,824,778 | 2/1958 | Robbart | 8—116 |
| 2,562,955 | 8/1951 | Schuyten | 260—212 |

DONALD E. CZAJA, *Primary Examiner.*

R. W. MULCAHY, *Assistant Examiner.*

U.S. Cl. X.R.

260—448.2